(12) United States Patent
Edelmayer

(10) Patent No.: US 7,632,401 B2
(45) Date of Patent: Dec. 15, 2009

(54) FLOOR SYSTEM USING CUSTOMIZED DRAIN FLASHER ADAPTER MEMBRANES

(75) Inventor: Eric J. Edelmayer, Grand Haven, MI (US)

(73) Assignee: Noble Company, Spring Lake, MI (US)

(*) Notice: Subject to any disclaimer, the term of this patent is extended or adjusted under 35 U.S.C. 154(b) by 0 days.

(21) Appl. No.: 11/555,959

(22) Filed: Nov. 2, 2006

(65) Prior Publication Data

US 2008/0106094 A1 May 8, 2008

(51) Int. Cl.
*E04F 17/00* (2006.01)
*E04B 1/70* (2006.01)

(52) U.S. Cl. ................... 210/164; 52/302.6

(58) Field of Classification Search ............. 52/302.1, 52/302.6, 58, 60, 61, 62; 210/163, 164, 165, 210/166
See application file for complete search history.

(56) References Cited

U.S. PATENT DOCUMENTS

| | | | | |
|---|---|---|---|---|
| 1,503,421 A | * | 7/1924 | Innes | 285/42 |
| 2,025,814 A | | 12/1935 | Goss | |
| 2,106,516 A | * | 1/1938 | Cheney | 4/613 |
| 2,239,969 A | | 4/1941 | Morthland | |
| 2,275,628 A | | 3/1942 | Hirshstein | |
| 2,299,705 A | | 10/1942 | Svirsky | |
| 2,484,240 A | | 10/1949 | Morthland | |
| 2,672,205 A | * | 3/1954 | McDonald | 285/42 |
| 2,749,999 A | | 6/1956 | Schmid | |
| 2,859,452 A | | 11/1958 | Seewack | |
| 2,985,465 A | | 5/1961 | Church | |
| D216,693 S | | 3/1970 | Dammer | |
| 3,893,919 A | * | 7/1975 | Flegel et al. | 210/166 |
| 3,935,878 A | * | 2/1976 | Ostevik | 137/334 |
| 4,098,287 A | * | 7/1978 | Baumbach | 137/362 |
| 4,122,230 A | | 10/1978 | Lowell | |
| 4,230,346 A | | 10/1980 | Gobel | |
| D269,454 S | | 6/1983 | Houseman | |
| 4,423,527 A | * | 1/1984 | Morris et al. | 4/288 |
| 4,652,321 A | | 3/1987 | Greko | |
| 4,694,513 A | | 9/1987 | Kiziah | |
| 4,779,899 A | | 10/1988 | Williams | |
| 4,850,617 A | * | 7/1989 | Moberly | 285/42 |
| 5,022,430 A | | 6/1991 | Degooyer | |
| 5,299,836 A | | 4/1994 | Woods | |
| 5,371,980 A | | 12/1994 | Dix | |
| 5,615,526 A | * | 4/1997 | Palmer et al. | 52/302.1 |
| 5,829,214 A | * | 11/1998 | Hart | 52/302.6 |

(Continued)

*Primary Examiner*—Gay Ann Spahn
(74) *Attorney, Agent, or Firm*—Price, Heneveld, Cooper, DeWitt & Litton LLP (57) ABSTRACT

A floor system includes a clamping ring drain assembly for funneling water to an opening of in-floor drain plumbing. The drain assembly includes clamping rings and a cover for the input opening. A waterproof membrane has marginal material defining a hole, with the marginal material being located outboard of the upper clamping ring. A customized floor drain flasher adapter membrane has an outer first ring bonded to the marginal material of the waterproof membrane, creating a double thick ring outboard of the clamping rings. The adapter membrane further includes a ring of transition material sloping to the clamping rings. The adapter membrane has a preformed shape selected to match a vertical dimension at the construction site, so that the adapter membrane is not bent, stretched, folded or wrinkled during construction/installation, hence preventing water leaks, puckering of the membrane, and membrane cracking.

9 Claims, 8 Drawing Sheets

U.S. PATENT DOCUMENTS

| | | | |
|---|---|---|---|
| 5,845,347 A | 12/1998 | Young | |
| 5,882,043 A * | 3/1999 | Murphy et al. | 285/42 |
| 5,899,026 A * | 5/1999 | Williams et al. | 52/58 |
| 6,170,095 B1 * | 1/2001 | Zars | 4/507 |
| 6,223,356 B1 * | 5/2001 | Corbin | 4/252.1 |
| 6,431,387 B2 * | 8/2002 | Piehler | 220/495.01 |
| 6,532,877 B1 * | 3/2003 | Hepburn et al. | 105/404 |
| 6,755,966 B1 * | 6/2004 | Reed | 210/164 |
| 6,766,545 B2 | 7/2004 | Hodges | |
| 6,810,537 B1 * | 11/2004 | Barnes et al. | 4/507 |
| 7,100,331 B2 * | 9/2006 | Nehring | 52/13 |
| 2003/0037498 A1 * | 2/2003 | Bishop | 52/302.1 |
| 2004/0187396 A1 * | 9/2004 | Higgins | 52/58 |
| 2005/0028270 A1 * | 2/2005 | Nehring | 4/613 |
| 2005/0028456 A1 * | 2/2005 | McLane et al. | 52/58 |
| 2005/0066435 A1 * | 3/2005 | Barnes et al. | 4/507 |
| 2005/0166471 A1 * | 8/2005 | Allen | 52/58 |
| 2006/0059813 A1 * | 3/2006 | Froeter et al. | 52/302.1 |
| 2006/0242913 A1 * | 11/2006 | Zhou | 52/19 |
| 2007/0056088 A1 | 3/2007 | DeGooyer | |
| 2007/0204399 A1 | 9/2007 | DeGooyer | |
| 2007/0289058 A1 * | 12/2007 | Luk | 4/629 |
| 2008/0168727 A1 * | 7/2008 | Ledford et al. | 52/302.3 |
| 2008/0181738 A1 * | 7/2008 | Capriotti et al. | 408/207 |

* cited by examiner

FLOOR SYSTEM USING CUSTOMIZED DRAIN FLASHER ADAPTER MEMBRANES

BACKGROUND

The present invention relates to in-floor drain constructions incorporating membranes for sealing and moisture control, and further relates to construction methods for in-floor drain constructions.

It is well known in the building and construction industry that every construction site is different. Despite the best-made architectural plans, construction sites require on-site modifications and adjustments in order to complete a well-constructed building. One area where this is problematic is in in-floor drain constructions, for both new constructions and remodeling jobs. Because drains require water to flow by gravity, construction workers will tend to error by placing underground plumbing "too low" . . . as opposed to placing the drain exactly as specified. One reason this is done is to absolutely assure that the underground plumbing will be sufficiently low for the "interface" drain components (floor drain cover, couplings, clamping rings, collars, flashings, seals, etc.) to accept water flowing from the floor into the in-floor drain. This problem is compounded by the fact that it is difficult to accurately control a thickness and relative height of a poured-cement floor, especially as it is smoothed to a good contour for water flow toward the area of an in-floor drain. As a result, the gap distance from a top of the floor around the floor drain to the underground plumbing is often "too great" (or on the maximum tolerance) for the standard floor drain components, and adjustments have to be made.

Notably, existing floor drain constructions often include threaded couplings and collars and other "hard" parts providing some level of adjustability. However, an area where the problem has not been adequately addressed is in the flexible waterproof membranes used to assure water flow into the floor drain (i.e., to assure that water does not flow by capillary action into an area outside the floor drain). Construction workers (even tile installers familiar with in-floor drain installations) will tend to deform the flexible waterproof membrane for a floor drain to an extent greater than is appropriate in an attempt to "make it work" . . . such that a durability and function of the flexible waterproof membrane is compromised. Admittedly, it is difficult to know how much deformation of the membrane is "too much." If the waterproof membrane cracks or breaks, the resulting water leak may not be noticed until long after the construction worker is done (especially if the crack is small). Even if the waterproof membrane isn't fractured or broken immediately, "over-stretched" membranes will pucker and/or be stressed in ways that will cause future leak problems or poor water flow. Despite these problems, construction companies continue to order their full requirement of floor drain components well in advance of the actual need, so that the floor components are available on-site when the workers want them. Further, supply companies continue to stock standardized components and continue to ship based on drawing specifications alone.

More specifically in regard to floor drain systems using clamping rings and tiled flooring, building blueprints call for a particular vertical dimension and specific special relationship between the clamping ring drain and the sub-floor grade. The floor drain construction must be installed so that the floor drain and associated water-sealing membrane can be installed to drain water with good gravity flow from the floor into the drain, and without water leaks, puckering or other unacceptable deformation of the membrane, membrane cracking, and without other durability issues. In actual construction sites, it is extremely difficult to pour a concrete floor with a properly sloped top surface for good water flow while at the same time creating an opening for the floor drain construction to have a "perfect" vertical dimension and a "perfect" spacial arrangement for operably connecting the actual in-floor drain to the concrete floor. A number of factors contribute to the difficulty in actual construction sites. For example, in slab-type on-grade constructions, the vertical drain pipe is generally installed prior to the finished floor grade being installed. In most cases, the plumbing or the mechanical contractor sets the final height of the clamping ring drain. Some downward gravity flow is essential to allow for runoff and capillary action of entrapped water on the membrane. Clamping ring drains are very often set lower than specified on the construction drawing details for reasons noted above. Hence, when the trades that install floor tiles begin their work, it often becomes difficult or impossible to adapt the waterproof membrane system into the clamping ring drain assembly. The fact that one trade pours the cement floor and a different trade installs the floor drain and floor tile can also aggravate the problem, since the cement-pouring trade is potentially less "sensitive" to the tile trade's problems.

There are at least two waterproofing construction methods that are commonly used in resident and commercial construction, one being pre-manufactured membrane systems and the other being liquid membrane systems. Both of these methods necessitate solutions to this elevation problem. With the pre-manufactured membranes (i.e., formed waterproof sheet), it is very difficult to force the membrane to deform down to the level of the clamping ring without unacceptable stress on the membrane since the membrane is pre-formed to have a three-dimensional dish-like shape in its center for good drainage. This deformation problem is aggravated by the material of the membrane, which tends to be flexible out of plane (i.e. bendable like a thin flexible sheet), but stiff "in-plane" (i.e., if tensioned in one direction, the material will form undulations or low areas in adjacent areas that collect water, and/or will tear). Pre-manufactured membranes can be made as a single ply monolithic sheet, or a composite sheet, but each type has a limit to the amount of deflection and transition deformation that can be attained on the job site. Specifically, pre-manufactured membranes are formed with a relatively flat outer ring and dish-shaped center, such that any bending out of plane in one area (especially downward deflection of its center region) results in puckering or undulations of the sheet in adjacent areas of the membrane. In liquid systems, it is difficult to transfer a liquid material down into a clamping ring drain system to form a quality continuous sealing member, even if the drain is set at the correct grade height. It is further difficult to form a uniform, durable watertight sealing membrane without imperfections and/or without weak areas that cause immediate or future leak problems.

The above noted problems in waterproofing systems have existed for years without being solved. Thus, a method having the aforementioned advantages and solving the aforementioned problems is desired.

SUMMARY OF THE PRESENT INVENTION

In one aspect of the present invention, a method of constructing an in-floor drain in an open space in a floor comprises steps of measuring a vertical distance from a component in the floor to an in-floor drain pipe, and ordering a customized floor drain flasher adapter membrane having an outer first ring for engaging the floor component and having an inner second ring for positioning adjacent an entrance to the drain pipe and having a third ring of connecting material extending therebetween, the first and second rings being spaced apart a dimension correlated to the measured vertical distance. The method further includes assembling a floor drain construction including installing a standard waterproof membrane along with the customized floor drain flasher adapter membrane in the open space to connect to an input opening of the in-floor drain to form a water-draining construction that does not leak and that prevents unnatural and uneven folding, bending or stretching of the membrane, hence preventing water leaks, puckering of the membrane, membrane cracking, and providing good durability and long-lasting installation of the in-floor drain.

In another aspect of the present invention, a method supporting the construction of an in-floor drain in an open space in a floor comprises steps of creating an inventory of different types of pre-manufactured floor drain flasher adapter membranes, each of the adapter membranes having an outer first ring for engaging marginal material in a waterproof membrane and having an inner second ring for positioning adjacent an input opening of an in-floor drain pipe and having a third ring of material extending therebetween, the first and second rings defining a specific vertical dimension, each of the different types of the different floor drain flasher adapter membranes having a different specific vertical dimension. The method further includes receiving a measurement from a construction site of a vertical distance representing a distance from the in-floor drain pipe to a location of the marginal material of the waterproof membrane when the waterproof membrane is installed as part of forming the floor, and selecting one of the different types of floor drain flasher adapter membranes, the selected one having a specific dimension that is close to the measurement. The method still further includes shipping the selected one floor drain flasher adapter membrane to the construction site on a just-in-time basis for installing in the open space to connect the input opening of the drain pipe to the waterproof membrane to form a water-draining construction that does not leak and that prevents unnatural and uneven folding, bending or stretching of the waterproof and adapter membranes, hence preventing water leaks, puckering of the membranes, membrane cracking, and providing good durability and long-lasting water-tight installation of the floor drain.

In another aspect of the present invention, an improvement is provided for a clamping ring drain assembly configured to funnel water from a floor surface into an input opening of in-floor drain plumbing. The clamping ring drain assembly includes a base ring configured for connection to the in-floor drain plumbing, an intermediate ring configured for connection to the base ring, an upper clamping ring configured for connection to the intermediate ring, a cover for covering the input opening, and a waterproof membrane having marginal material defining a hole located over the upper clamping ring and located generally outboard of an outer edge of the upper clamping ring when assembled, with the input opening of the in-floor drain plumbing to the marginal material defining a measurable vertical distance. The improvement comprises a customized floor drain flasher adapter membrane having an outer first ring configured to engage the marginal material of the waterproof membrane and having an inner second ring for positioning near the input opening to the drain plumbing and having a ring of transition material connecting the first and second rings, the first and second rings being vertically spaced apart and having a dimension correlated to the measurable vertical distance; whereby when assembled, the floor drain construction including the waterproof membrane and the flasher adapter membrane combine to connect to the input opening of the drain pipe in the floor in a water-draining construction that does not leak and that prevents unnatural and uneven folding, bending or stretching of the membranes, hence preventing water leaks, puckering of the membrane, membrane cracking, and providing good durability and long-lasting installation of the floor drain.

These and other aspects, objects, and features of the present invention will be understood and appreciated by those skilled in the art upon studying the following specification, claims, and appended drawings.

PRIOR ART

Figure 1:
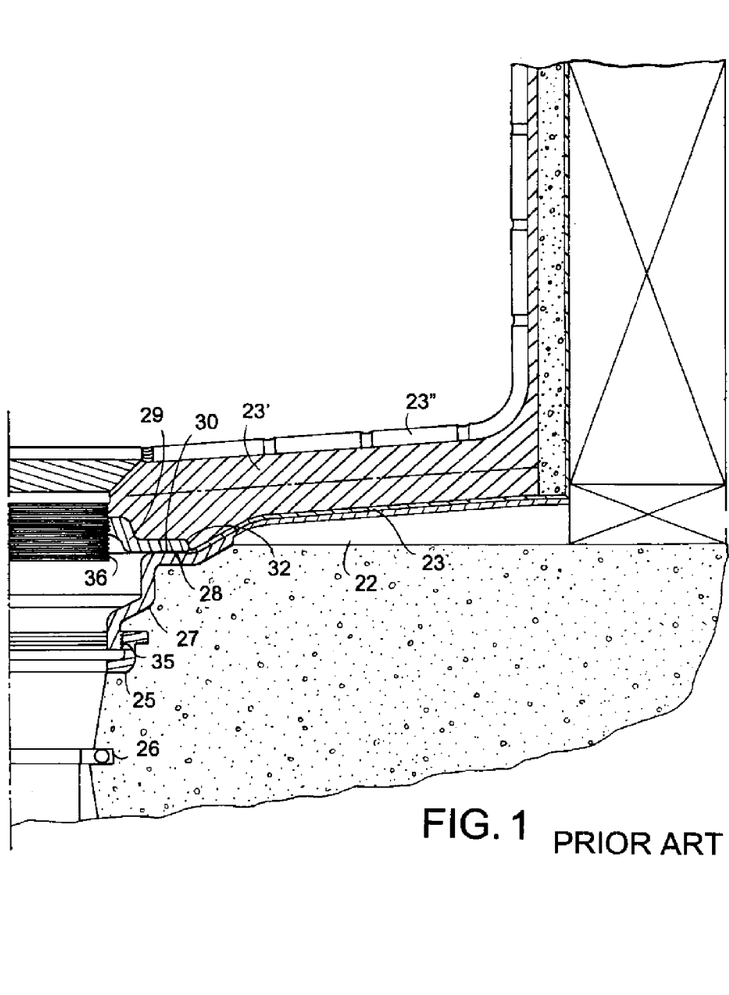
FIGS. 1-2 are side cross-sectional views showing a prior art in-floor drain including a waterproof membrane.
Figure 2:
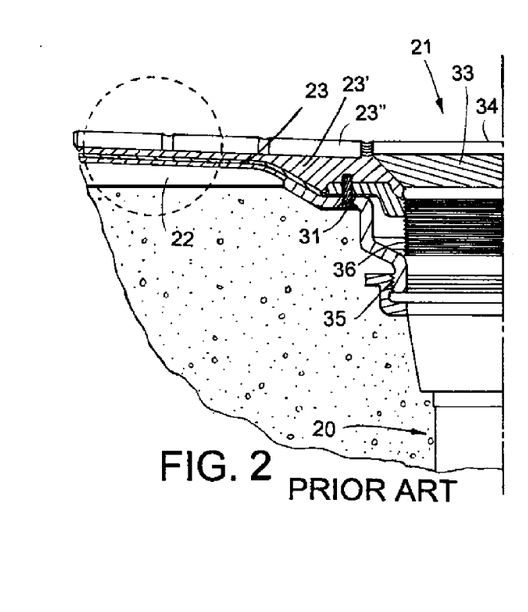

A known clamping ring floor drain system with a waterproof membrane 23 is shown in the attached FIGS. 1-2, and includes a rough plumbed drain pipe 20 and a clamping ring drain assembly 21. A mortar/cement floor 22 slopes toward the drain assembly 21. The waterproof membrane 23 (liquid set or pre-manufactured) is laid on the cement floor 22 and a layer of mortar 23' adheres tile 23" to the membrane 23. The clamping ring drain assembly 21 includes a base ring 25 attached to a support strap 26 at a top of the rough plumbing pipe 20, an intermediate clamp ring 27 threadably adjustably engages the base ring 25 and presents a smooth upper surface 28, and an upper clamp ring 29 includes a smooth lower surface 30 that engages the upper surface 28 of the intermediate clamp ring 27 for clamping engagement of the waterproof membrane 23. Fasteners 31 extend from the intermediate clamp ring 27 through holes in an inner portion of the top flange 32 that forms the smooth lower surface 30. A floor drain cover 33 is then threaded downwardly into a top of the upper clamp ring 29. The floor drain cover 33 includes a screen top 34 that covers the drain entrances.

In a good installation, the membrane 23 is smooth, unstressed, and relatively wrinkle-free, and further slopes toward the entrance of the drain pipe 20 such that water flows naturally by gravity and capillary action toward and into the drain. A problem is that, for various construction reasons, the drain pipe 20 (and hence the clamping ring drain assembly 21) is often "too low" relative to the adjacent areas of the cement floor 22 (see FIG. 2). There is some adjustment of the "hard" components permitted by the threads 35 between the intermediate clamp ring 27 and the base ring 25. But, when the intermediate clamp ring 27 is adjusted to its extreme lower position using threads 35, the marginal material 23A of the membrane 23 is stretched and areas around it are stressed and caused to pucker and wrinkle (and/or tear) as it is forced from its natural pre-formed shape. Inverting the upper clamping ring 29 has not proved to satisfactorily solve this problem in the field (compare FIGS. 1-2). Also, using more or less of the threads 36 on the upper clamping ring 29 (compare FIGS. 1-2) does not solve this problem since this approach does not prevent unacceptable stretching of the membrane. As a result, a stretch problem can and often does occur in the membrane resulting in in-floor drain installations that leak and/or where leaks can develop and/or poor water flow occurs.

DETAILED DESCRIPTION OF PREFERRED EMBODIMENTS

The present method includes creating an inventory of different pre-manufactured floor drain flasher adapter membranes, each of the adapter membranes having a different specific vertical dimension. The method further includes taking measurements at a construction site, including measuring a vertical distance from a location where marginal material of the waterproof membrane will be in the floor downwardly to a top of an in-floor drain pipe system. This information is used to order a customized floor drain flasher adapter membrane dimensioned to match the floor structure at the construction site. The method further includes assembling a floor drain system to the floor structure at the construction site, including installing the customized floor drain flasher adapter membrane in the open area around the drain pipe. By this arrangement, the drain flasher adapter membrane is installed in an optimal manner with minimized stress such that the waterproof and adapter membranes are not unevenly folded, nor undesirably bent or stretched, and hence provides a more robust and durable system. This greatly reduces a problem of improperly installed (i.e., unacceptably deformed and/or distorted) floor drain flasher adapter membranes that has existed in and plagued the "floor drain" industry for many years. Notably, the adapter membrane can be bonded to the waterproof membrane at the factory prior to shipment, or bonded at the construction site as part of the installation.

Figure 3:
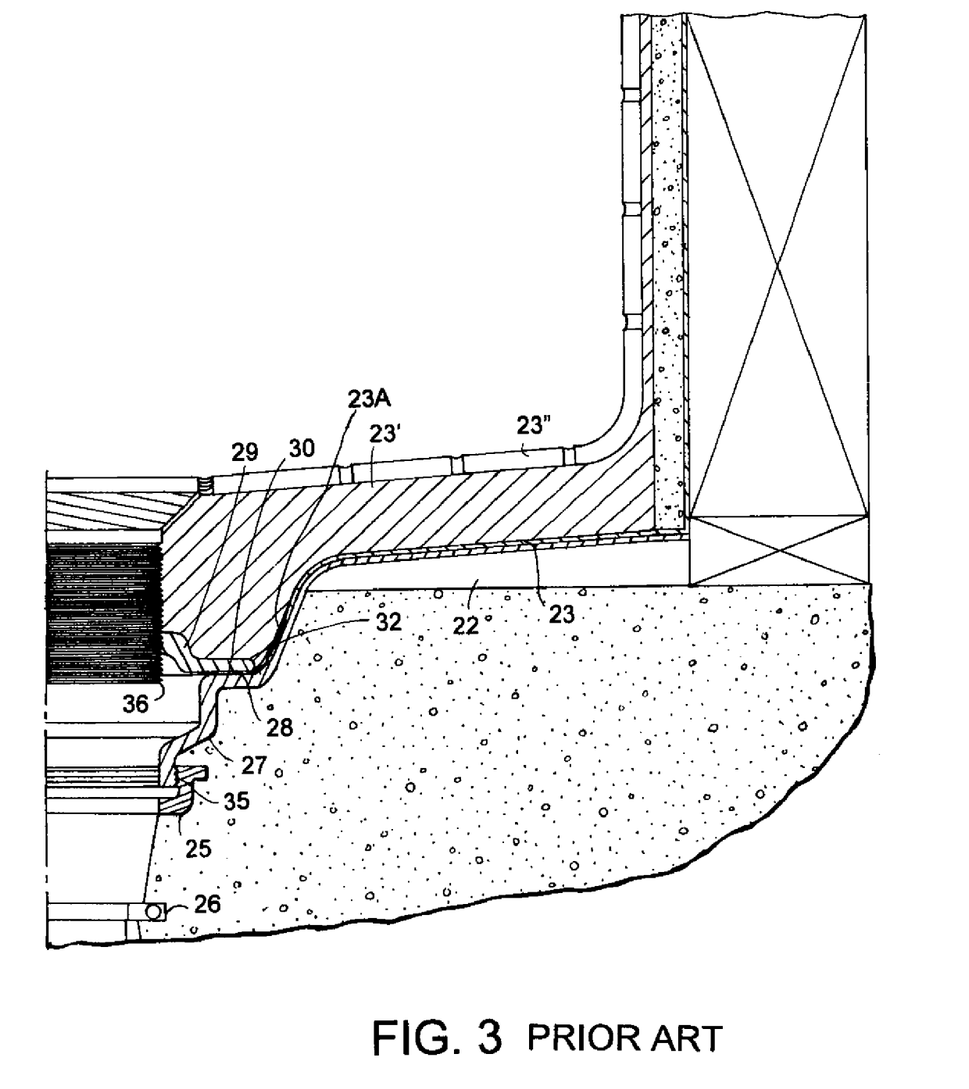
FIG. 3 is a side view of prior art similar to FIG. 1, but depicting the waterproof membrane as forcibly deformed.
Figure 4:
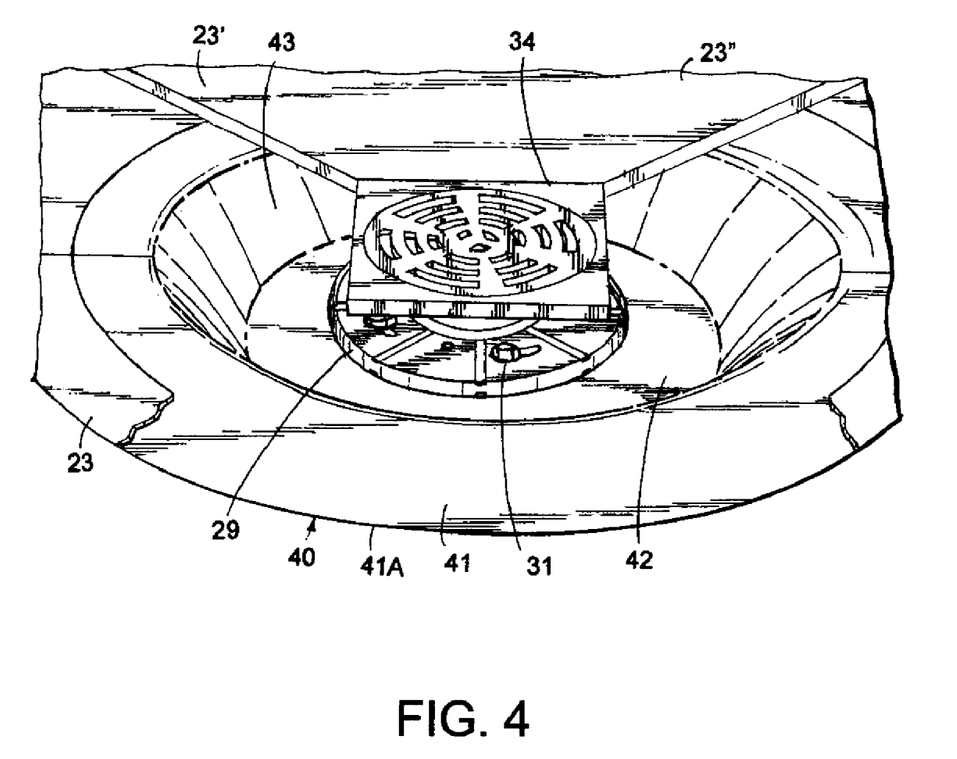
FIG. 4 is a perspective view of an installation including the adapter membrane.
Figures 5, 5A:
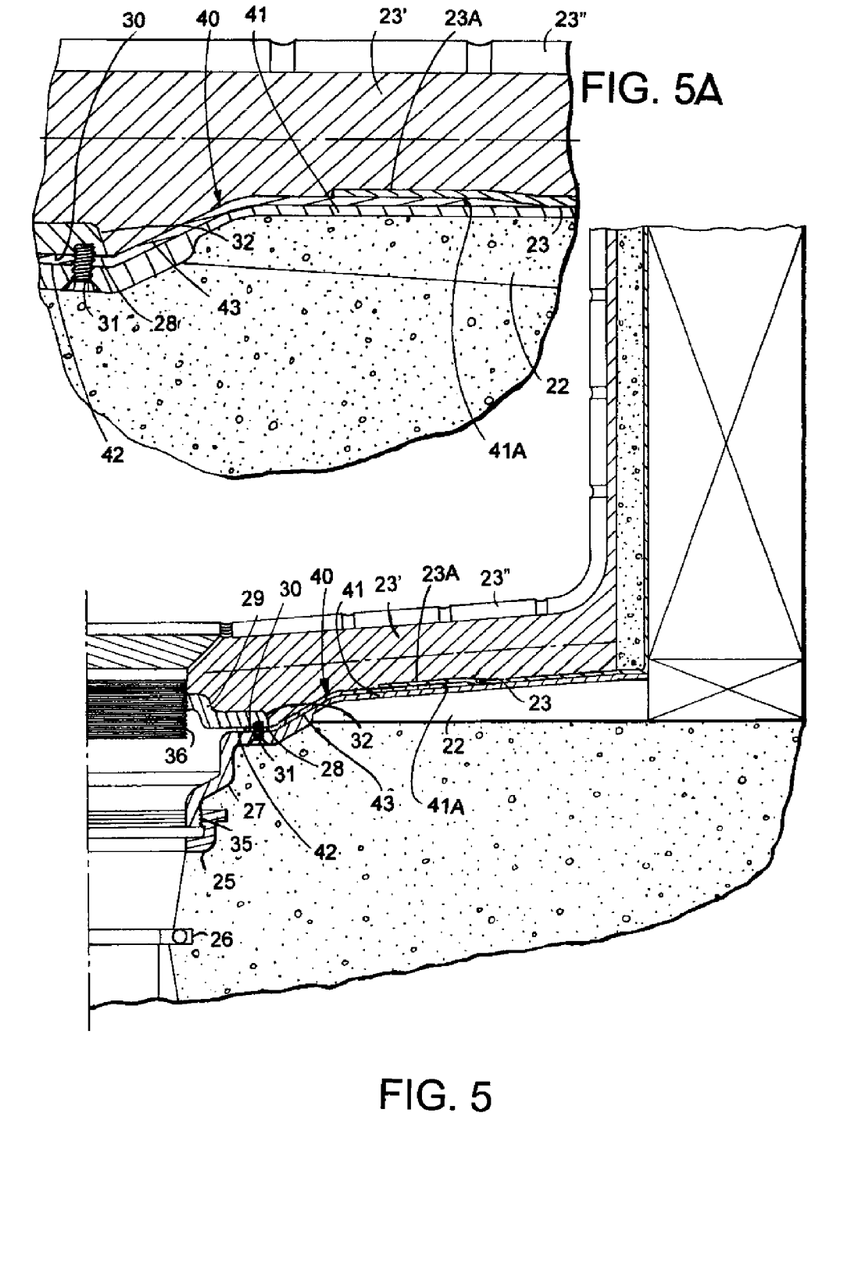
FIG. 5 is a side cross-sectional view of an in-floor drain incorporating the present customized floor drain flasher adapter membrane.
FIG. 5A is an enlargement of the overlapped outer ring portion of the adapter membrane in FIG. 5.
Figure 6:
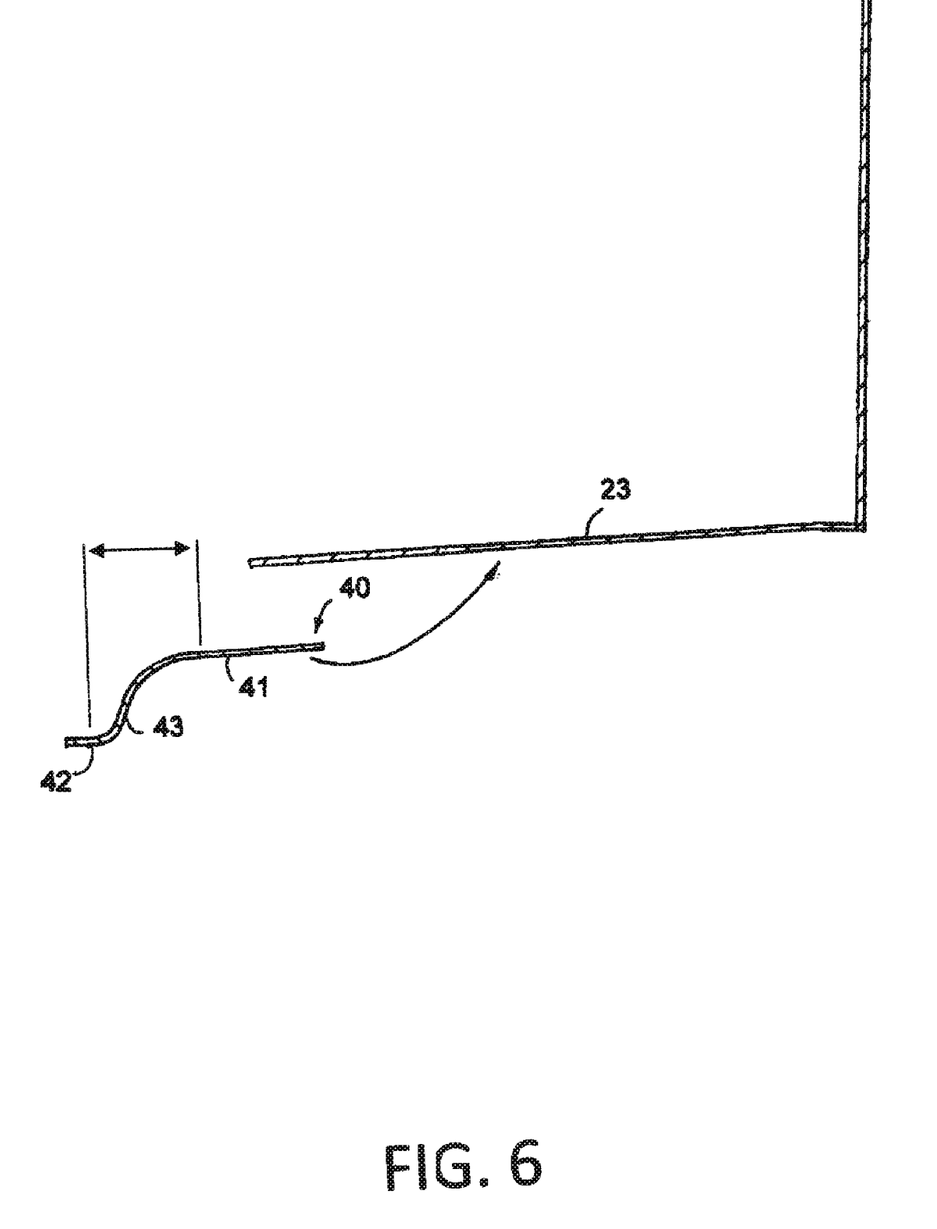
FIG. 6 is a side cross-sectional view of a first floor drain flasher adapter membrane attached to a primary waterproof membrane.
Figure 7:
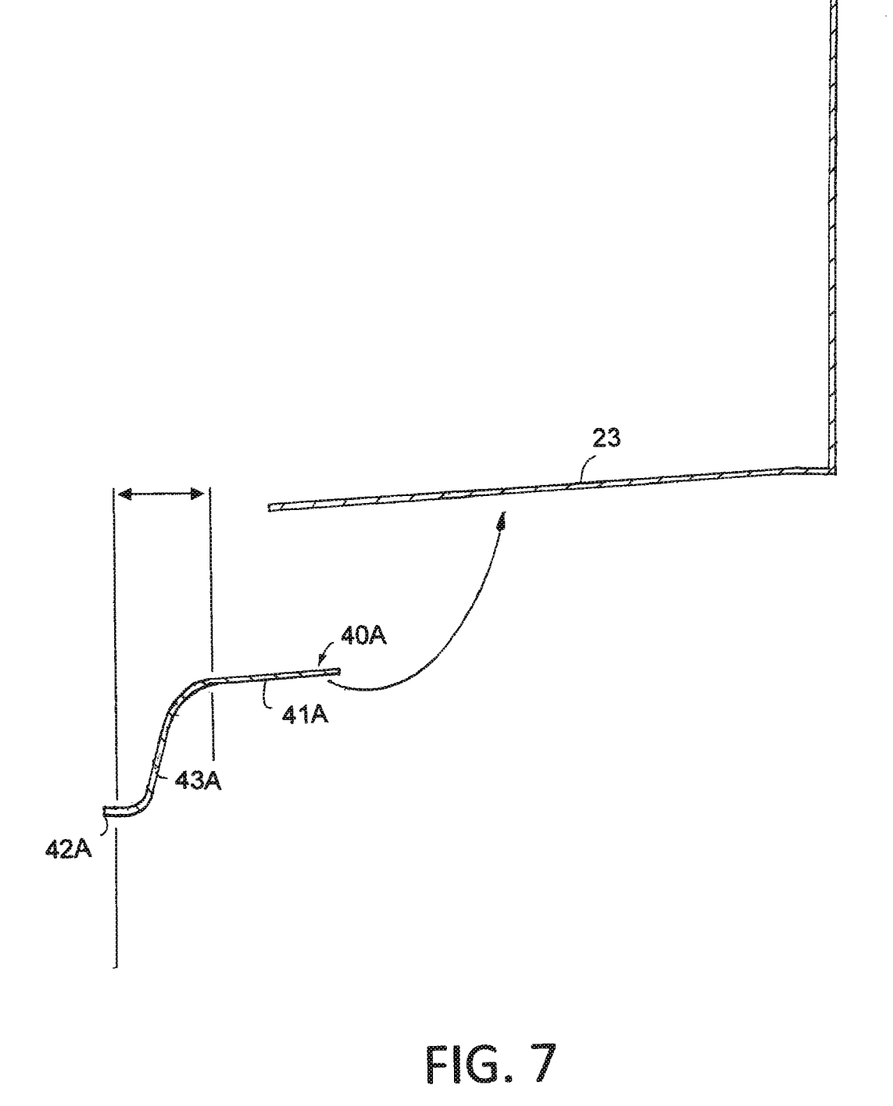
FIGS. 7 and 8 are similar views of second and third floor drain flasher adapters of different shapes that are also attached to the primary waterproof membrane.
Figure 8:
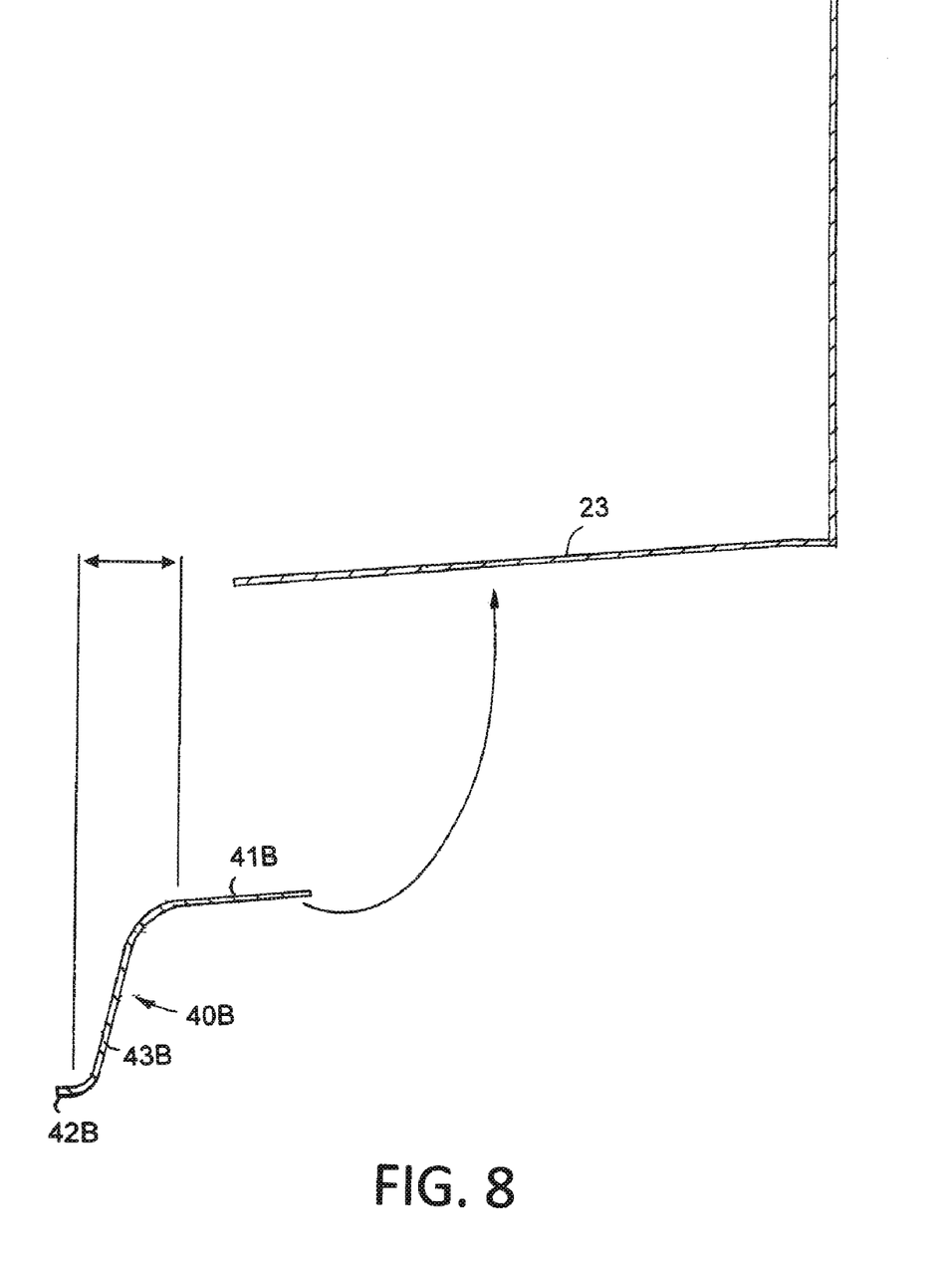
Figure 9:
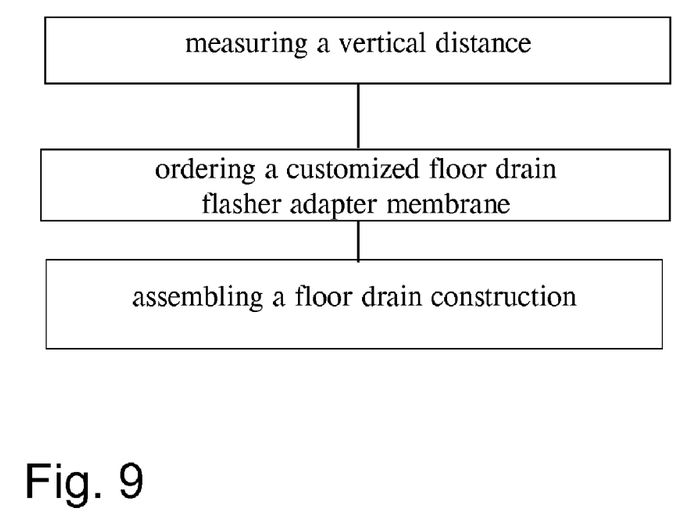
FIG. 9 is a flow chart showing a method of constructing an in-floor drain.
Figure 10:
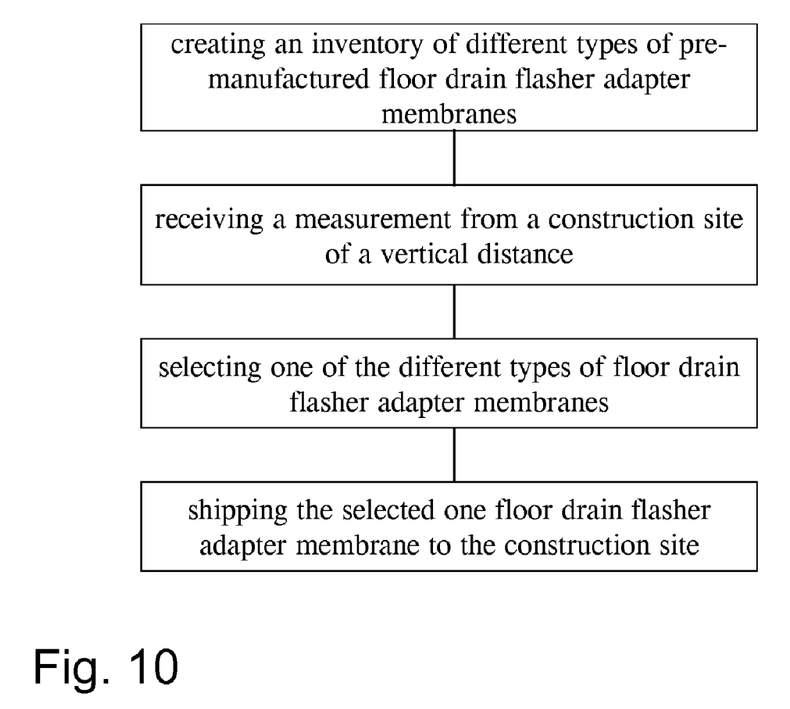
FIG. 10 is a flow chart showing a manufacturing method.

Specifically, the present floor drain flasher adapter membrane 40 (FIGS. 3-4) includes a relatively flat outer ring portion 41 with an outer edge 41A shaped to be adhesively bonded to an inner annular flange of marginal material 23A on the membrane 23. The present adapter 40 further includes an inner ring portion 42 shaped to be clamped between the surfaces 28 and 30 as the upper clamp ring 29 is clamped downwardly onto the intermediate clamp ring 27. The adapter 40 further has a frustoconically shaped intermediate ring portion 43 that extends between and connects the inner and outer ring portions 42 and 41. Notably, the intermediate ring portion 43 could be another shape, but the frustoconical shape provides good water flow and control. The present inventor contemplates that a plurality of different adapters 40, 40A, 40B (FIGS. 6-8) can be provided, each having different depth intermediate ring portions 43, 43A, 43B, each being different such as by ¾ inch stepped increments (or by other increments such as ½ inch or 1 inch increments). In a preferred system, at least two adapter membranes are provided (i.e., inventoried by the membrane manufacturer), one having a ¾ inch deep intermediate ring portion 43 and the other having a 1½ inch deep intermediate ring portion 43A. The particular adapter 40, 40A or 40B to be used would be selected based on measurements taken at the construction site, once the specific height dimension requirements are known (i.e., after the cement floor is poured and finished over the in-floor drain piping). The adapter membrane 40 could be attached to the membrane 23 either at the factory and shipped UPS overnight on a just-in-time basis, or can be configured for adhering attachment of the adapter membrane to the waterproof membrane at the installation site.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. In a floor system providing a relatively flat waterproof floor surface for a person to safely stand on but sufficiently sloped to drain water and moisture toward and into a drain, the floor system including a clamping ring drain assembly configured to funnel water from the floor surface into an input opening of in-floor drain plumbing; the clamping ring drain assembly including a base ring configured for connection to the in-floor drain plumbing, an intermediate ring configured for connection to the base ring, an upper clamping ring configured for connection to the intermediate ring, and a cover for covering the input opening but that does not extend above the floor surface, an improvement comprising:

the floor system including a waterproof membrane and mortar and tiles supported on and bonded to the waterproof membrane around the drain assembly that form the floor surface; the waterproof membrane having marginal material defining a hole, all of the marginal material being located outboard of an outer edge of the upper clamping ring when assembled, the input opening of the in-floor drain plumbing to the marginal material of the waterproof membrane defining a measurable vertical distance; and a first customized floor drain flasher adapter membrane having an outer first ring bonded to the marginal material of the waterproof membrane to define a double-thick area of bonded material extending around but located outboard of the upper clamping ring and having an inner second ring for positioning near the input opening to the drain plumbing and having a ring of frustoconically-shaped transition material connecting the first and second rings, the first and second rings being vertically spaced apart and having a dimension correlated to the measurable vertical distance; whereby when assembled, the waterproof membrane and the flasher adapter membrane combine to connect to the input opening of the drain plumbing of the floor system in a water-draining construction that does not leak and that reduces unnatural and uneven folding, bending or stretching of the membranes, hence substantially eliminating water leaks, puckering of the membranes, cracking of the membranes, and providing good durability and a longer-lasting installation of the floor system.

2. The improvement defined in claim 1, including a second customized floor drain flasher adapter membrane identical in shape to the first customized floor drain flasher adapter membrane, the second customized floor drain flasher adapter membrane having a ring of transition material having a vertical dimension different from the dimension of the first customized floor drain flasher adapter membrane.

3. The improvement defined in claim 2, wherein the dimension defined by the first customized floor drain flasher adapter membrane is about ¾ inch and the vertical dimension defined by the second customized floor drain flasher adapter membrane is about 1-½ inches thick.

4. The improvement defined in claim 2, including a third customized floor drain flasher adapter membrane identical in shape to the first customized floor drain flasher adapter membrane, the third customized floor drain flasher adapter membrane having a ring of transition material having a vertical dimension different from the dimension of the first customized floor drain flasher adapter membrane and different from the vertical dimension of the second customized floor drain flasher adapter membrane.

5. A floor system configured to funnel water from a floor surface into an input opening of in-floor drain plumbing; the floor system including a clamping ring drain assembly having a base ring configured for connection to the in-floor drain plumbing, an intermediate ring configured for connection to the base ring, an upper clamping ring configured for connection to the intermediate ring, and a cover for covering the input opening; an improvement comprising:

a waterproof membrane having marginal material defining a hole, all of the marginal material being located outboard of an outer edge of the upper clamping ring when assembled, the input opening of the in-floor drain plumbing to the marginal material of the waterproof membrane defining a measurable vertical distance;

a customized floor drain flasher adapter membrane having an outer first ring bonded to the marginal material of the waterproof membrane to define a double-thick area of bonded material extending around but located outboard of the upper clamping ring and having an inner second ring for positioning near the input opening to the drain plumbing and having a ring of transition material connecting the first and second rings, the first and second rings being vertically spaced apart and having a dimension correlated to the measurable vertical distance; whereby when assembled, the floor system including the waterproof membrane and the flasher adapter membrane combine to connect to the input opening of the drain plumbing to the floor system in a water-draining construction that does not leak and that substantially eliminates unnatural and uneven folding, bending or stretching of the membranes, hence reducing water leaks, puckering of the membranes, cracking of the membranes, and providing good durability and long-lasting installation of the floor system, the waterproof membrane and the adapter membrane being adapted to bond to and support mortar and tiles to form a solid floor system that will not crack when supporting a person standing on the floor surface at and around the drain plumbing.

6. A waterproof floor system with a drain that is adapted to support a person's weight thereon without leaking, comprising:

a waterproof membrane subassembly including a waterproof membrane defining a relatively flat floor surface adapted to support a standing person and having marginal material defining a hole with the floor surface sloping gradually toward the hole, the waterproof membrane subassembly further including a floor drain flasher adapter membrane defining a recessed area extending below the hole;

a clamping ring drain assembly configured to funnel water from the floor surface into an input opening of in-floor drain plumbing; the clamping ring drain assembly being configured for connection to the in-floor drain plumbing and further including clamping rings for clamping onto the adapter membrane;

the marginal material of the waterproof membrane being located outboard of an outer edge of the clamping rings when assembled, the marginal material of the waterproof membrane to the input opening of the in-floor drain plumbing defining a measurable vertical distance;

the floor drain flasher adapter membrane having an outer first ring bonded to the marginal material of the waterproof membrane to define a double-thick area of bonded material extending around but located outboard of the clamping rings and further having an inner second ring for positioning near the input opening of the in-floor drain plumbing and still further having a ring of frusto-conically-shaped transition material connecting the first and second rings and defining the recessed area, the first and second rings being vertically spaced apart and having a dimension correlated to the measurable vertical distance; whereby, when assembled, the waterproof membrane and the flasher adapter membrane combine to allow water to flow to the input opening of the in-floor drain plumbing and further combine to form a water draining construction that does not leak and that substantially eliminates unnatural and uneven folding, bending or stretching of the membranes.

7. The floor system defined in claim 6, including mortar and tiles supported on and bonded to the membrane subassembly to form a hard floor structure.

8. The floor system defined in claim 6, including a cover for covering the clamping ring drain assembly, the cover extending coplanar with the floor surface and not extending above the floor surface.

9. The improvement defined in claim 5, including mortar and tiles supported on and bonded to the waterproof membrane.

* * * * *